United States Patent [19]
Khello

[11] Patent Number: 5,724,423
[45] Date of Patent: Mar. 3, 1998

[54] METHOD AND APPARATUS FOR USER AUTHENTICATION

[75] Inventor: Robert Peter Khello, Norsborg, Sweden

[73] Assignee: Telefonaktiebolaget LM Ericsson, Stockholm, Sweden

[21] Appl. No.: 529,405

[22] Filed: Sep. 18, 1995

[51] Int. Cl.$^6$ .................................................. H04K 1/00
[52] U.S. Cl. ................................................. 380/23; 380/46
[58] Field of Search ................................. 380/23, 25, 49, 380/46

[56] References Cited

U.S. PATENT DOCUMENTS

| | | |
|---|---|---|
| 4,023,013 | 5/1977 | Kinker . |
| 4,385,231 | 5/1983 | Mizutani et al. . |
| 4,801,787 | 1/1989 | Suzuki . |
| 4,856,062 | 8/1989 | Weiss . |
| 4,924,514 | 5/1990 | Matyas et al. . |
| 5,023,908 | 6/1991 | Weiss . |
| 5,060,263 | 10/1991 | Bosen et al. . |
| 5,120,939 | 6/1992 | Claus et al. . |
| 5,157,717 | 10/1992 | Hitchcock . |
| 5,239,583 | 8/1993 | Parrillo . |
| 5,251,259 | 10/1993 | Mosley . |
| 5,321,242 | 6/1994 | Heath, Jr. . |
| 5,367,572 | 11/1994 | Weiss . |
| 5,371,797 | 12/1994 | Bocinsky, Jr. . |

FOREIGN PATENT DOCUMENTS

| | | |
|---|---|---|
| 0 112 944 | 7/1984 | European Pat. Off. . |
| 2582421 | 11/1986 | France . |
| 2019060 | 10/1979 | United Kingdom . |
| 2020513 | 11/1979 | United Kingdom . |
| 92-07436 | 4/1992 | WIPO . |

*Primary Examiner*—David C. Cain
*Attorney, Agent, or Firm*—Nixon & Vanderhye P.C.

[57] ABSTRACT

A user authentication service is disclosed which is both highly secure and user friendly. To access a particular service, a user simply enters a personal identification type number (PIN) using a portable terminal device which encodes the PIN. More specifically, a character position of the user's PIN is determined, and a random code having a length selectable at each service transaction by the user is generated. The user's PIN is encrypted using one of plural available, pseudo-randomly encrypting algorithms to provide an encrypted PIN. The encrypted PIN is then combined with the code at the determined position before being transmitted over a communications network. When received, the encoded PIN is decoded using an analogous procedure to determine if the user is authorized. A plurality of security levels are provided with each level having a plurality of encryption algorithms and with each increasing level providing encryption algorithms of increasing complexity and sophistication. A user may also change a current PIN from the portable device easily and securely without having to contact a service center.

54 Claims, 12 Drawing Sheets

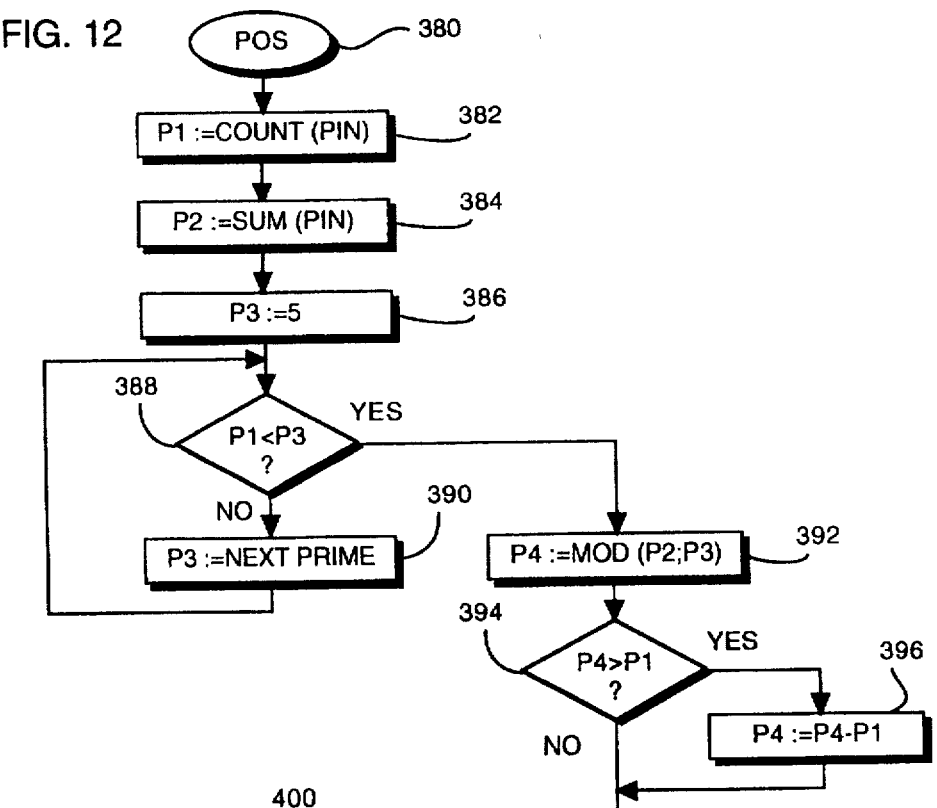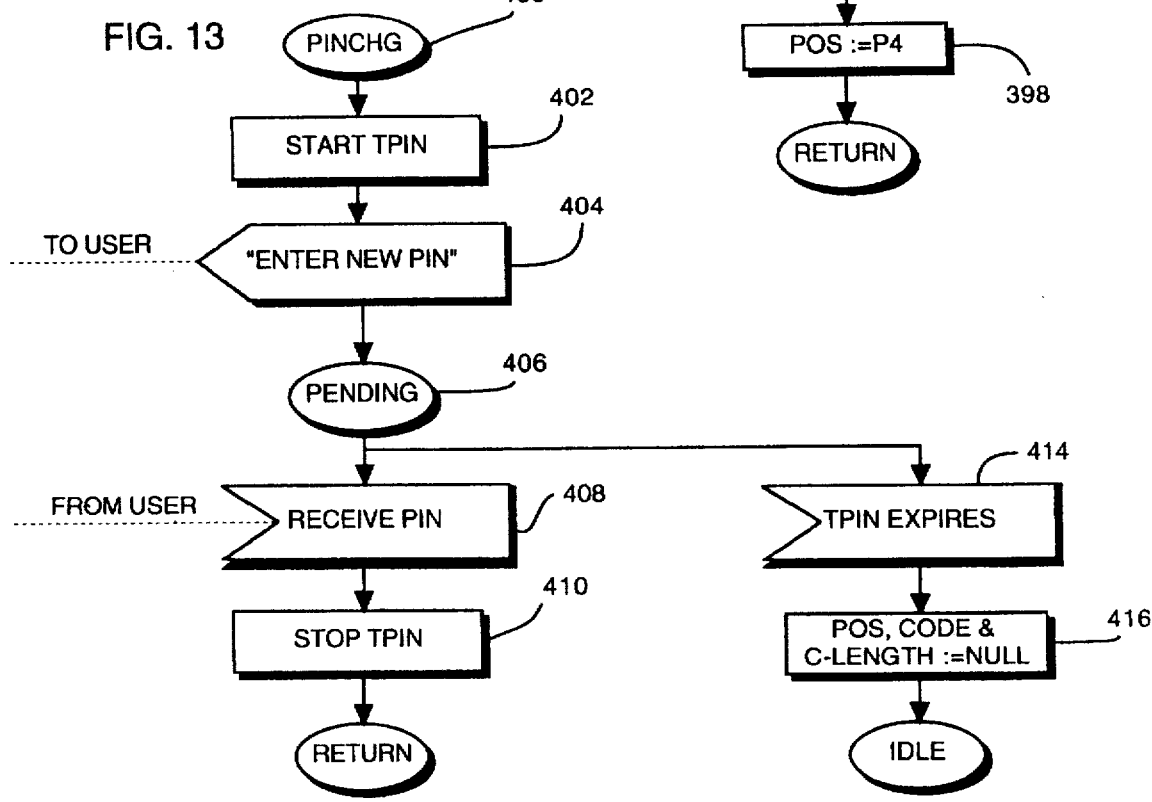

METHOD AND APPARATUS FOR USER AUTHENTICATION

FIELD OF THE INVENTION

The present invention relates to the field of security access, and more particularly, to a method and apparatus for restricting unauthorized access while at the same time keeping legitimate access simple and convenient for authorized users/subscribers.

BACKGROUND OF THE INVENTION

In this specification, the term service application is used as a generic term to describe various types of service transactions, including but not limited to the following examples: credit card, cash card, and banking transactions; telecommunications services including long distance telephone calls, voice mail, facsimile mail, interactive voice response; data communications services such as access to a computer facility via computer networks, etc. Such services are typically accessible and provided to a user if the user enters an appropriate security code.

Therefore, if a user desires to make a long distance telephone call using a telephone credit card or calling card, the user initiates a request for that service by dialling a number and pressing an appropriate dedicated service key at the terminal (or making the request verbally with an operator). The user is identified by the service and in this example such user identification might be the user's own telephone number or credit card number. After user identification, the user may be prompted to input a secret security access code such as the well known four digit personal identification number or PIN. While the terms "PIN" and "character" are used for convenience throughout the specification, it should be understood that these terms are not limiting. A user's PIN includes any string of characters or symbols, including numbers, alphabetic characters, a combination of numbers and letters, etc. Thus, even though terms in the description such as PIN or digit suggest numbers, it is to be understood that the personal identification code may include any alphanumeric character or other symbol.

The main use of security access codes such as PINs is to deter and hopefully prevent unauthorized access to and use of service applications. One example where security is very important but not always maintained is credit cards. If a credit card is stolen, the thief can forge the card owner's signature to fraudulently and illegally purchase goods and other services. Such fraudulent use may be significantly reduced if a secret PIN is also required to authorize any purchase using the credit card. When the entered PIN is compared against a stored PIN and the two PINs do not match, access (to use the credit card) is prohibited. As a further security measure, after a certain number of unsuccessful attempts where the PINs do not match, any further attempts to use the PIN whether legitimate or not are terminated to prevent "hackers" from inputting a large number of PINs at random in an attempt to gain access by a fortuitous match.

Another security problem relates to eavesdropping over a communications network. An eavesdropper can tie into such a network and detect characters being transmitted. If the information being transmitted (including a PIN) is not encrypted, the eavesdropper can electronically detect and use that information. This eavesdropping problem is exacerbated by the fact that PIN numbers encoded using relatively simple encoding algorithms can without too much difficulty be decoded and the PIN information extracted.

There are various options for further improving security. One option is to make access codes longer, which makes considerably more difficult the hacker's task of trying to identify the code and/or break an encrypted version of the code to gain access by a fortuitous match. Longer access codes also are useful at public service terminals because they are more difficult to observe and memorize by unauthorized persons (or devices) located near enough to observe entry of a PIN number at the terminal. A second option is to provide each user with plural PIN codes and require the user to enter each of the plural PIN codes in sequence. Neither of these two options, however, is user friendly because both require the user to memorize additional code digits or additional complete codes.

A third option is to require the user to change his PIN code each time a service is requested, i.e. every service transaction. The drawback here is that the user must either memorize a list or write down a list of PIN codes. Either way, a user can easily forget or confuse one of the PIN codes in the list, forget to carry any list of PIN codes, lose the list, or even worse, discover the list is stolen. A fourth option is to provide a user with a scrambling terminal, but such terminals typically are bulky and deter user mobility.

Thus, there is a need to provide a user authentication service that offers a high level of security but yet is still user friendly. In other words, there is need to provide user services that provides the user and the service provider with a highly secure procedure for ensuring a user is authorized that is not particularly burdensome on the user in terms of preparation (code memorization), execution (actually remembering and accurately entering the code), and flexibility (bulky, non-portable terminals).

SUMMARY OF THE INVENTION

It is an object of the present invention to provide a user authentication service that is highly secure and user friendly.

It is an object of the present invention to provide highly reliable and secure user authentication that does not require a user to memorize a long sequence of digits in an elongated PIN code, a plurality or other sequence of PIN codes, or a bulky scrambling terminal.

It is an object of the present invention to provide a high level of security that only requires a user to memorize one PIN code.

It is an object of the present invention to provide the user with the ability to select amongst a plurality of security levels suitable to the user's particular security needs and applications.

It is an object of the present invention to permit a user, once authorized, to change his PIN in a highly secure, user friendly fashion without having to contact or even obtain prior approval by a service provider.

It is a further object of the present invention to detect fraudulent attempts to misappropriate a user's PIN and notify a user as well as a service provider of fraudulent attempts.

It is a further object of the present invention to permit a user to access the service application even on occasions where loss of, defective or forgotten user authentication device occur.

The present invention provides a method of encoding a personal identification string including the steps of entering a personal identification string, generating randomly or pseudo-randomly a multi-digit code, and inserting the code between characters in the personal identification string at a particular character position after the personal identification string has been encrypted. The personal identification string is encoded using one of a plurality of encoded algorithms selected based on an encoding key determined for each transaction based on the code. The generated code is inserted after the encoding process and is generated randomly or pseudo-randomly. The length and characters of the code as well as the encoding key (and hence the encoding algorithm) vary each transaction resulting in a differently encrypted PIN where the number of characters in the encoded PINs differ between two service request transactions.

A user service requesting device in accordance with the present invention permits a user to conveniently request services electronically, e.g., over a communications network, and provides a high degree of access security. The user device is portable, held in the hand of a user, and carried for example in a shirt pocket or a wallet. A user enters his/her personal identification string along with a request for a particular user service via a keypad on the device. A user authentication program and plural encrypting programs are stored in the device's memory. Data processing circuitry in the device, in accordance with the various stored programs and information entered at the keypad, determines a character position of the user's personal identification string, generates a code, encrypts the user's personal identification string using one of the encrypting algorithms to provide an encrypted identification string, and combines the code with the encrypted identification string at the determined character position to generate a user identification code. The data processing circuitry selects a variable key using the generated code and user's entered personal identification string corresponding to one of plural encrypting algorithms. The user's personal identification string is encrypted using one of the encrypting algorithms corresponding to the selected variable key.

The present invention also provides a user authentication service (UAS) for authenticating the identity of a user requesting a service over a communications network. For each subscriber, the UAS stores a subscriber identification number along with a corresponding personal identification character string and a subscribed security level. For each request to authenticate an identity of a user requesting a service over a communications network, the UAS receives a subscriber identification number for that transaction, e.g., the user's telephone number, credit card number, bank account number, etc. With that identification number, the UAS retrieves the corresponding stored subscriber information. The user is also then prompted over the communications network to enter a personal identification string.

Upon the user's entry of a personal identification string, the UAS receives (via some communications medium) an encoded character string. A code length is then determined based on a difference between the retrieved string and the encoded string to provide a code length, i.e., a number of code characters. The absence of code characters in the received string indicates that the ordinary user's PIN is used as authentication. In addition, a character position of the encoded character string is also determined. The number of code characters is then retrieved beginning at the determined character position to identify the decoding key, and then those code characters are removed, leaving a reduced character string. The reduced character suing is decoded using one of plural decoding algorithms to provide the originally entered user personal identification string. The user entered character string is compared with the personal identification character string stored in the UAS corresponding to the determined subscriber identification. If there is a match, the service is authorized; otherwise, the service request transaction is terminated.

A number of unsuccessful PIN entry attempts is maintained where the user entered character string is not the same as the stored character string. That number of unsuccessful PIN entry attempts is reported each time the user authentication service is requested which could be more than one request per transaction. More specifically, the number of unsuccessful PIN entry attempts is reported to the user before the PIN entry prompting step. When the number of attempts exceeds a predetermined value, the service request transaction is terminated.

The present invention also provides a highly secure mechanism for a user to change his PIN from a current PIN to a new PIN. Once the user's initially input PIN is confirmed as authenticate in a service request transaction and the user indicates a desire to change PINs, the user is prompted to enter the new PIN (which does not have to be the same length as the current PIN) and then reprompted to re-enter the new PIN. The user device generates second and third new codes added to the new second PIN and the re-entered third PIN which have the same length as the first code added to the current PIN during this transaction. Second and third keys are determined using the general procedure described above but are different from the first key generated for this transaction. As a result, the first entered and current PIN, when encrypted, is not the same as the encrypted new (second) PIN or encrypted (third re-entered) PIN. Nonetheless, the UAS decodes the first, second, and third differently encrypted PINs, and registers the new PIN (assuming the user enters and re-enters the same new PIN). Significantly, the PIN changing operation occurs completely at the convenience of the user (i.e., the PIN change does not require contacting any service provider to request a new PIN either orally or in writing) and at the same high security level used to encode and decode that user's PIN during normal service transactions.

The UAS provides a subscriber with a wide range of security options in terms of different security levels. For example, the UAS provides many different levels of security to which a user can subscribe. Each security level includes a plurality of encryption algorithms that can be selected using the encryption key mechanism described above. Thus, security level one may include for example eleven available encryption algorithms. The user may subscribe to any number of those eleven encryption algorithms, e.g., the user subscribes to three of the eleven. The larger the number of subscribed to encryption algorithms, the greater the security. In addition, the next security level includes plural (e.g., eleven) encryption algorithms of greater sophistication than the previous security level thereby providing greater security. In this way, the subscriber has maximum flexibility in constructing a suitable security level for the subscriber's particular security needs.

BRIEF DESCRIPTION OF THE DRAWINGS

These and other features and advantages of the present invention will become completely understood by referring to the following detailed description of presently preferred example embodiments in conjunction with the figures in which like reference numerals refer to like elements throughout:

FIG. 12 is a flowchart diagram illustrating procedures carried out by the user authentication service for determining a code position;

FIG. 13 is a flowchart diagram illustrating UAS procedures for changing a user's PIN.

DETAILED DESCRIPTION OF THE DRAWINGS

In the following description, for purposes of explanation and not limitation, specific details are set forth, such as, particular circuits, interfaces, techniques, etc. in order to provide a thorough understanding of the present invention. However, it will be apparent to one skilled in the art that the present invention may be practiced in other embodiments that depart from these specific details. In other instances, detailed descriptions of well known methods and programming procedures, devices, and circuits are omitted so as not to obscure the description of the present invention with unnecessary detail.

Figure 1:
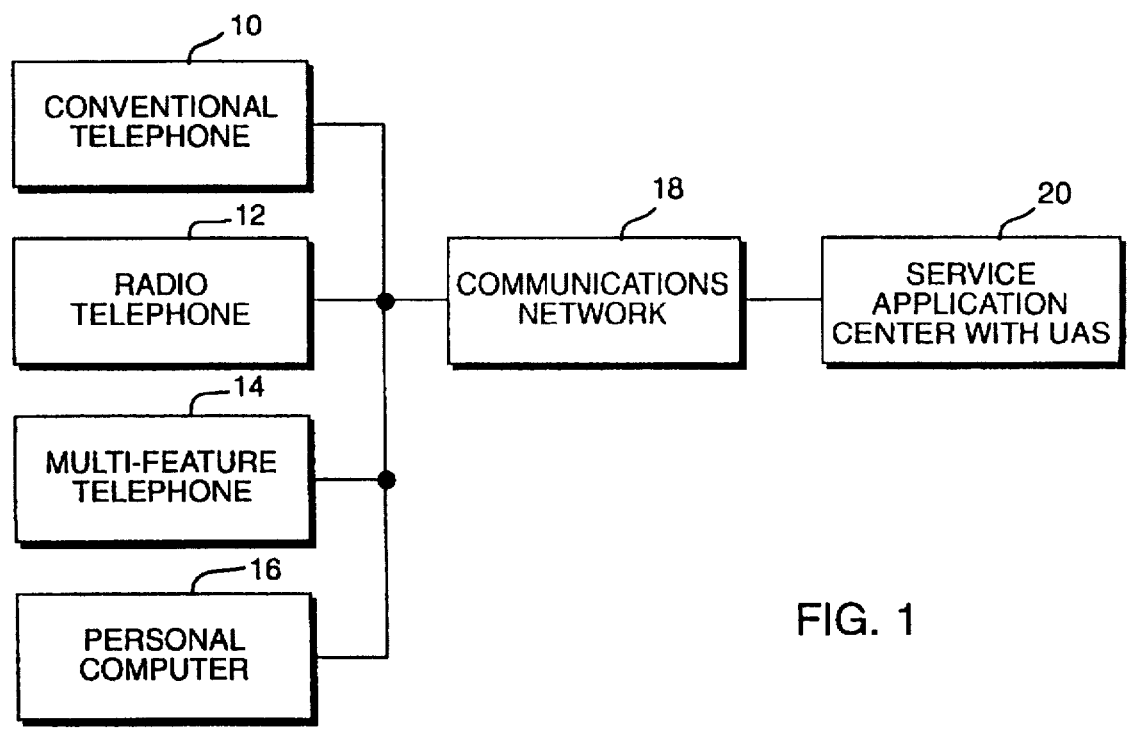
FIG. 1 is a diagram showing an example of a communications and electronic services system where a user authentication method and apparatus in accordance with the present invention may be used.

FIG. 1 shows an example of a communications and electronic services system where a user authentication method and apparatus in accordance with the present invention may be used. Various subscribers using different types of user service requesting devices including conventional wireline telephone 10, portable radiotelephone 12, multiple feature, intelligent wireline telephone 14, and personal computer (PC) 16 request particular services and transmit security access information over a communications network 18, such as the telephone lines, to a service application center 20. The service application center 20 may provide one or more of the following list (which is not exhaustive) of example services: voice mail, electronic mail, long distance and other telephone special services, banking transactions, credit card transactions, access and control of supplementary services applied on the basic call, etc. Also provided at the service application center is the user authentication service (hereafter UAS) which is invoked by one of the service applications to confirm the identity of the user requesting that service.

In accordance with the present invention, to ensure a high level of security, the user accompanies each service request with a multiple digit character (or any type of symbol) string referred to for purposes of the following description as a PIN. Each of the user service request devices 10–16 includes a separate encoding mechanism either as a separate device as for example in the case of a conventional telephone set or as an integral part electronic circuitry of the communications device, e.g., part of the data processing circuitry (or circuitry added to the radio telephone 12).

Figure 2:
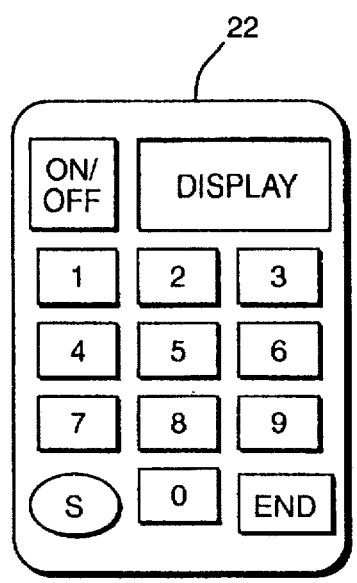
FIG. 2 is a illustrates a small, hand-held user device which may be used by a subscriber to obtain secure access to service applications.

FIG. 2 illustrates such a separate, portable user authentication encoding device 22 which includes an on/off key to enable/disable the user authentication service device, a display, numbered keys 0–9, a small speaker S, and an end key. The user is prompted either visually on the display and/or audibly on the speaker to enter his PIN. After entry of the PIN, the user presses the END button to initiate encoding and transmission to the user authentication service center. Preferably, the user device 22 is compact and can be carried and manipulated with one hand as well as fit into a shirt pocket or wallet.

Figure 3:
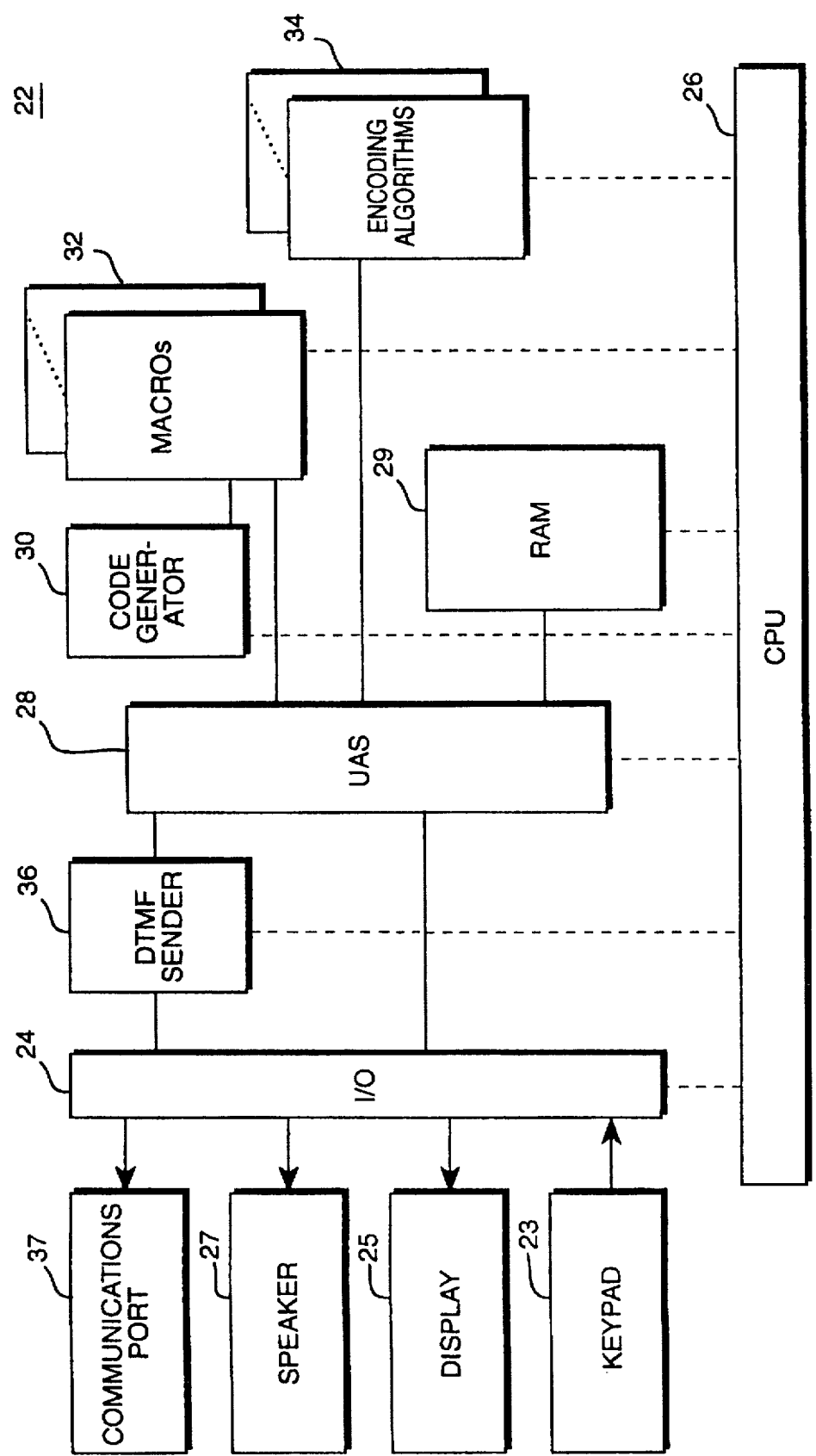
FIG. 3 is a function block diagram of control elements incorporated in the user device shown in FIG. 2.

FIG. 3 illustrates example hardware for implementing the user authentication service (UAS) encoding functions included either in the UAS device 22 or integrated with the existing electronic circuitry of some other user device, e.g., telephone, PC, etc. Both configurations (i.e., separate device or integrated) are referred to hereafter for ease of description collectively as "user device". The overall control and operation of the user device 22 is provided by central processing unit (CPU) 26 which may be one of commercially available single chip microprocessor/microcomputer devices. CPU 26 is connected to various memories 28, 29, 32, and 34. Although these memories are shown as separate blocks to facilitate description of the various data and/or programs contained therein, those skilled in the art will recognize that such different data and programs may be combined into fewer memories or even a single memory.

The UAS memory 28 contains the user authentication service program carried out by the user device described in more detail below in conjunction with FIGS. 5(a) and 5(b). Random access memory (RAM) 29 stores various data entered by the user (e.g., in the form of a database) and functions as a working memory for executing any of the various UAS or related programs. The following data are stored in the database and are described more detail below: an indication (such as a flag) of whether the user enters a code length or if the code length is to be generated by the user device CPU 26; a number of encoding algorithms corresponding to a prime number value Z; the last calculated encoding algorithm key when the user last turned the user device off; and the values calculated for the variables POS and C-length. The UAS software 28 calls upon various macros to perform particular data processing functions, and those macros are indicated as being stored in memory blocks 32. Similarly, various encoding algorithms 34 (typically but not limited to digital encryption algorithms) may be selected and used by the UAS software 28. In this description, encoding is used in two contexts: the first is in describing the overall processing of a user's PIN by the user device and the second is in describing a particular encoding algorithm. Encoding algorithms include but are not limited to encryption algorithms.

The UAS device 22 also includes a DTMF sender and a code generator 30 which generates a random or pseudo-random number of a prescribed length. An input/output (I/O) device 24 interfaces the CPU with display 25, keypad 23, speaker 27, and external communications port 37. The external communications port 37 communicates service requests and security information over the communications network 18 to the service application center 20. Although functional lines are shown between various blocks in FIG. 3, those skilled in the art will appreciate that the UAS device operates using conventional and well known memory access, I/O, and other data processing principles.

Figure 4:
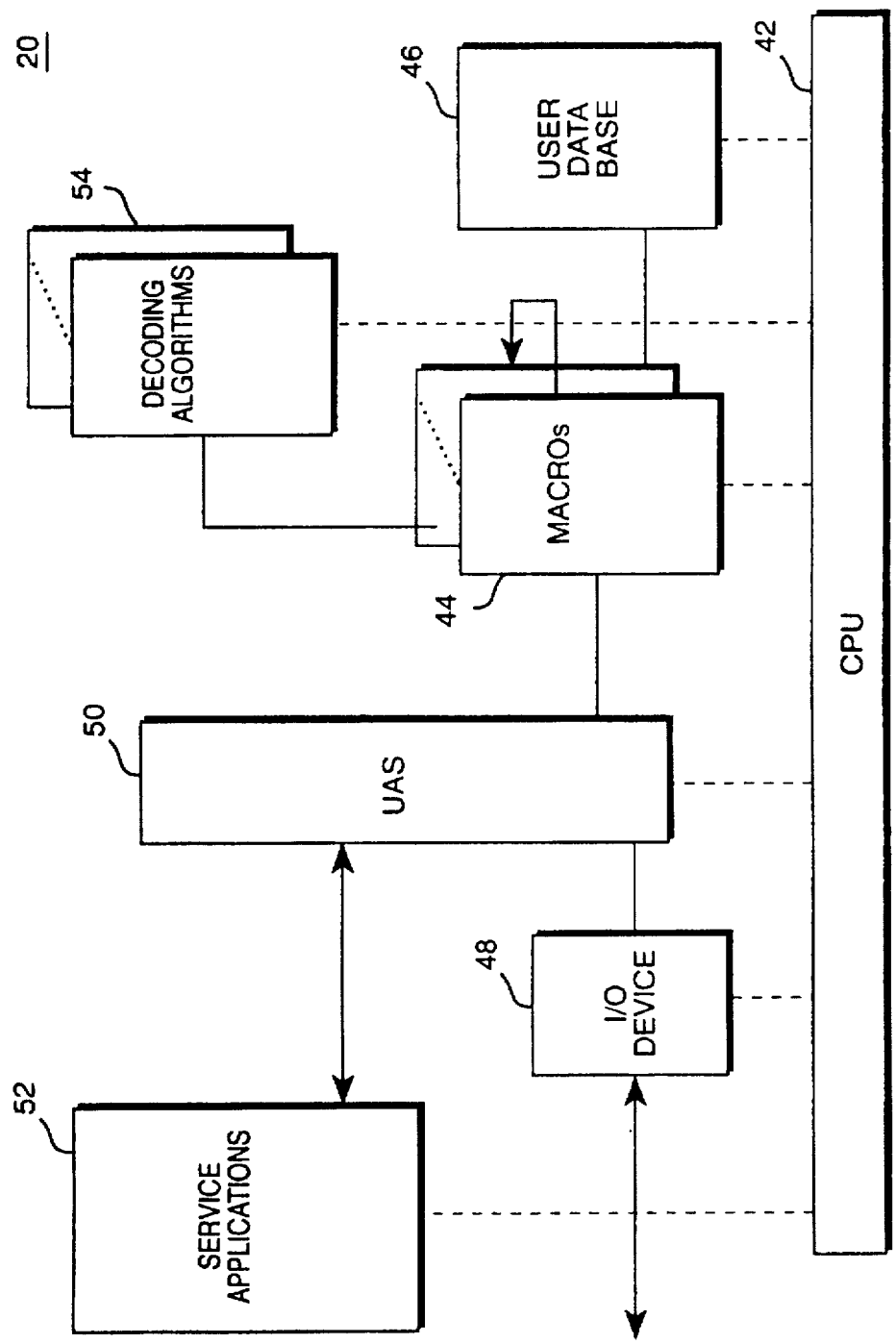
FIG. 4 is a function block diagram of the UAS at the network entity.

FIG. 4 is a function block diagram of the service applications center 20. At the heart of control and operations is central processing unit 42 connected to various memory blocks and I/O devices 48 connected to a plurality of communications ports. A plurality of service applications (examples of which were set forth above) are stored in memory block 52 which perform the substantive "service" portion (once authorized) of each service application transaction. The UAS software stored in block 50 (and described in further detail below in conjunction with FIGS. 10(a) and 10(b)) controls the user authentication process at the service applications center 20 to ultimately confirm or deny the authenticity of the service requester and therefore the authorization of the current service application request. Various macros (sometimes alternatively called subroutines) and decoding (typically decrypting) algorithms used by the UAS software 50 are stored in memory blocks 44 and 54, respectively. The service application center 20 also maintains a user/subscriber database 46 in which various UAS subscription data are stored including the information set forth in Tables 1 and 2 shown below.

TABLE 1

| | UAS subscription data | |
|---|---|---|
| User(s) | PIN Code (4 ... 10) | Security level (1 ... 10) |
| name, tlf no., ID, ... | PIN = xxxx | Level = x |
| . | . | . |
| . | . | . |
| . | . | . |
| name, tlf no., ID, ... | PIN = xxxx | Level = x |

TABLE 2

| List of encoding/decoding algorithms | | |
|---|---|---|
| security level | No. of Enc. Algorithms | Address |
| 1 | Z = z | Pointer |
| 2 | Z = z | Pointer |
| 3 | Z = z | Pointer |
| 4 | Z = z | Pointer |
| 5 | Z = z | Pointer |
| . | . | . |
| . | . | . |
| . | . | . |

Some sort of identification other than a PIN is stored for each user, such as a name, a telephone number, an ID number, etc. as indicated in Table 1. Associated with that user identification is that user's current PIN code which may include for example from four to ten characters or symbols. The security level represents which one of multiple, e.g., ten, different security levels to which a user may subscribe. In the example, there are ten possible levels, with each increase in level corresponding to an increase in security in terms of greater sophistication of encoding algorithm. For example, the encoding algorithms of security level 5 are more sophisticated (i.e., more sophisticated to "break") than the encoding algorithms of security level 3.

Table 2 shows that for each security level a total number of available of encoding algorithms, e.g., eleven, and a pointer address that points to the area in memory 46 where that security level's encoding/decoding algorithms are stored. In a preferred example embodiment, the Z variable is assigned only prime values, e.g., in the scenario where each security level has eleven available algorithms, the prime values would be 3, 5, 7 and 11.

The combination of different security levels (e.g., 1–10) and different multiple encryption algorithms (e.g., 3, 5, 7 and 11) provides the user and the service provider with a wide range of security levels. In this example, the user may flexibly select in this example between a maximum of 10×11=110 security algorithms from which the user may select and subscribe.

When subscribing to the UAS, an applicable list of encoding algorithms such as that shown in Table 2 is provided based on which a user requests security level parameters and provides his PIN code to the UAS. In that selection, the user selects the level of sophistication of encoding algorithms to be used and the specific number of encoding algorithms from those available at the selected level of sophistication. To even further improve security, the association between the security level and the associated encoding algorithms is kept secret (i.e., kept within the system and is not printed out). For each invocation of the UAS at the service applications center 20, the UAS retrieves a user's subscribed security level, the number of encryption algorithms, and the previously stored PIN in order to perform the necessary and appropriate decoding operation. At the same time, the subscriber is provided with an appropriate software package to incorporate into his particular user device which includes the number of encoding algorithms selected by the user within the user's subscribed security level.

Figure 5A:
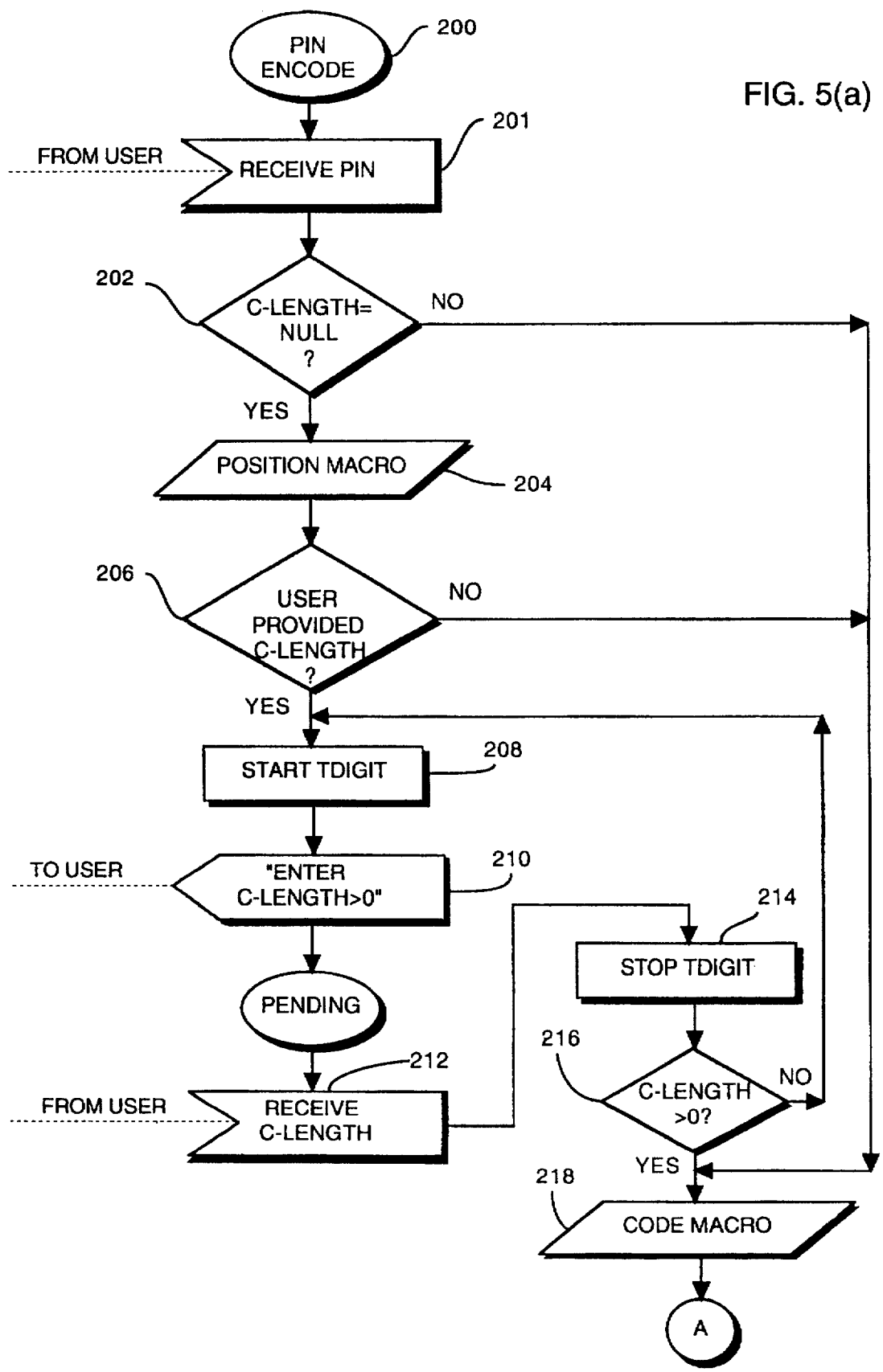
FIGS. 5(a) and 5(b) are flowchart diagrams of the security access procedures implemented at the user device when a user enters a PIN in a service request transaction.
Figure 5B:
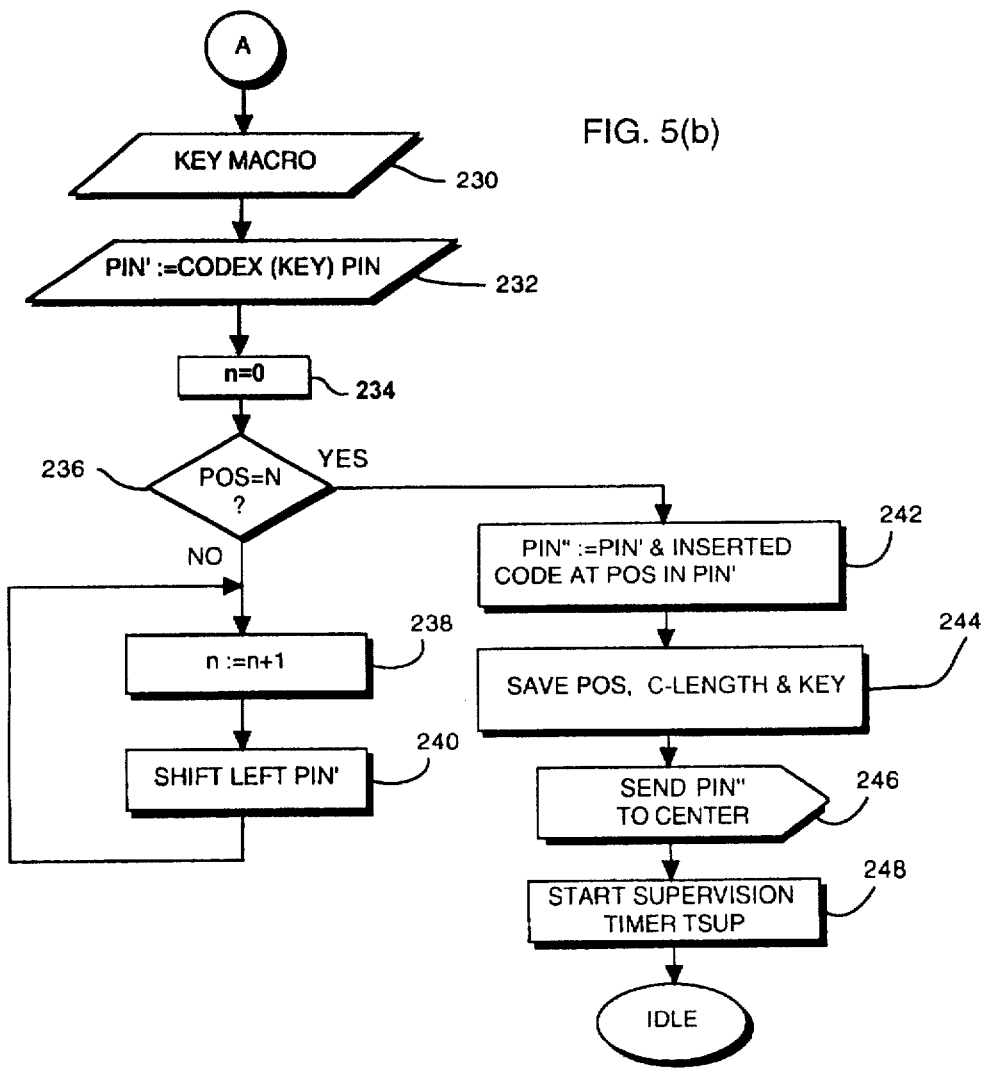

With these prerequisites in place, reference is now made to the following examples and FIG. 5(A) and FIG. 5(B) which describe the user authenticating process from the perspective of the user device. First, an example will be provided of encoding the user entered PIN in accordance with the present invention followed by an example of the procedures followed from the user device in the process of changing the user's PIN in accordance with the present invention.

EXAMPLE 1

UAS invocation, automatic generation of code, Z=5 algorithms

| | |
|---|---|
| 1) User enters PIN: | PIN=557356 |
| 2) Position MACRO: | Pos=MOD(31;7)=3 |
| 3) Code MACRO: | Code=5437 |
| 4) Generate C-length | C-length=4 |
| 5) Key MACRO | Key=MOD (5437;5)=2 |

-continued

| 6) Apply Codex with algorithm No.2: | PIN'=Codex(2) of PIN=346577 |
| 7) Insert Code into Pin' at position Pos: | PIN"=3465437577 |
| 8) User terminates: | C-length, Code & Pos=Null; key is preserved |

The next invocation of UAS may result in

| 1) User enters PIN: | PIN=557356 |
| 2) Posinon MACRO: | Pos=MOD (31;7)=3 |
| 3) Code MACRO: | Code=735 |
| 4) Generate C-length | C-length=3 |
| 5) Key MACRO: | Key=MOD (735;5)=0 |
| 6) Apply Codex with algorithm No.0: | PIN'=Codex (0) of PIN=824561 |
| 7) Insert Code into PIN' at position Pos: | PIN"=824735561 |
| 8) User terminates: | C-length, Code & Pos=Null; key is preserved |

As seen from the above example, the user's PIN includes six characters in the sequence 557356. A character position (POS) is determined in accordance with a Position macro described further below which indicates a character position 3 corresponding to a position between character 7 and character 3 of the entered PIN. Then a code is generated, either randomly or pseudo-randomly, anywhere for example from three to ten characters. The actual length of the code is set either by the user or is determined in some suitable fashion (preferably randomly) by the CPU 26 in the user device. In this case, the code 5437 of four characters corresponds to a code length of four.

An encoding "key" is determined based on the determined code in accordance with a Key macro described below which in this example equals the value of 2. Accordingly, the entered PIN 557356 is encoded using an encoding algorithm number 2 (corresponding to the key=2) to achieve an encoded identification string PIN'=346577. The previously determined code 5437 is inserted into the encoded PIN' at the previously determined code insertion position three which in this instance is the character position between 6 and 5 to achieve an encoded user identification code PIN" value equal to 3465437577.

The above example demonstrates that a user need only remember his/her PIN code (in this case six characters long), and the user device generates a coded and encrypted PIN" that is highly secure against electronic eavesdroppers, hackers, etc. In other words, the likelihood of a hacker being able to randomly guess in any reasonable number of tries the user's PIN, position, code, and encoding algorithm is extremely small.

Then, at a next invocation of the UAS in the above example for the same user using the same PIN and position POS, the user selects or CPU 26 selects a different code length. Since a different code value and code length are generated, the encryption key is different. As a result, a different encryption algorithm at the subscribed security level is used resulting in a different PIN'. The different code with a different length is inserted into the third character position of the different PIN' to yield a PIN" completely different from the prior transaction. Comparing the two PIN"s, not only are the characters themselves completely different, the number of characters is also different (although the number of characters can be the same).

Referring to FIG. 5(a) which outlines the basic user authentication procedures in accordance with the present invention carried out at the user device side. Starting at PIN encode block 200, the user device waits for the user to key in a PIN code (in response to a prompt). After receiving the user entered PIN, a decision is made in block 202 whether the code length variable C-length is equal to zero (referred to as "null"). The C-length is nulled at termination either because the user device is deactivated (the transaction is completed and the user turns off the device) or because there has been too many unsuccessful PIN entry attempts. If C-length is null, the Position macro (described more below) is executed to determine the code insert position POS for this transaction. A decision is made in block 206 whether the user has provided the code length. If so, control proceeds to blocks 208–216 where the user is prompted to enter a code length value greater than zero, and the code length is confirmed or denied as properly entered before a time out period expires. With the user selected and entered code length or code length obtained via the UAS, the code macro is executed in block 218 generating a random or pseudo-random character pattern as described in more detail below in conjunction with FIG. 8. Significantly, the user does not need to memorize anything to initiate or complete the coding process. The user is prompted simply to enter a positive number. Notwithstanding this user friendliness, the user's selection of the code length to be used for each transaction makes the user's PIN very difficult to detect and is one of many features of the present invention that adds considerably to the increased level of security. If the C-length is other than null in block 202 or if the user has not provided a C-length value in block 206, the code length is already set, i.e., the C-length is already set or the CPU 26 sets the C-length.

Figure 9:
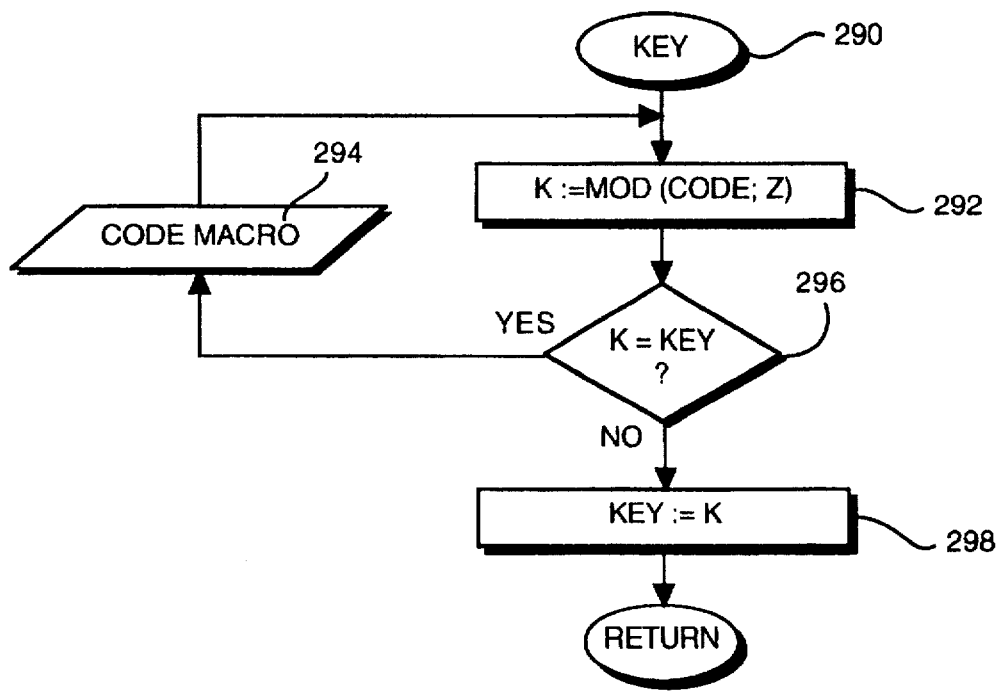
FIG. 9 is a flowchart diagram illustrating encryption key generating procedures used to select one of a plurality of encryption algorithms then used to encrypt the user entered PIN.

Control then proceeds to FIG. 5(b) via flag A to block 230 where the Key macro shown in FIG. 9 is executed using the just determined code returned by the Code macro and the security level Z subscribed to by the user to generate a key value. The user entered PIN number is then encoded using the encoding algorithm corresponding to the just determined key selected from the various encoding or encryption algorithms available for the security level subscribed to by the user.

A position counter value variable N is set to 0 in block 234, and a decision is made whether the code insert position value POS equals N. If not, the count N is incremented in block 238 and the encrypted PIN' is shifted in wrap around fashion one character to the left. The purpose of this operation is to shift the PIN' by the number of character positions indicated by the position variable so that the code can be inserted at that appropriate point in the PIN' string. Then PIN" is generated by inserting the calculated code at the position POS. Thus, if PIN' equals 34567 and position POS equals 3 and the code equals 178, PIN" equals 34517867. In other words, the code is inserted at POS (0) followed by three shifts in the opposite direction, i.e., to the right. The position, code length, and key are saved in block 244.

Figure 6:
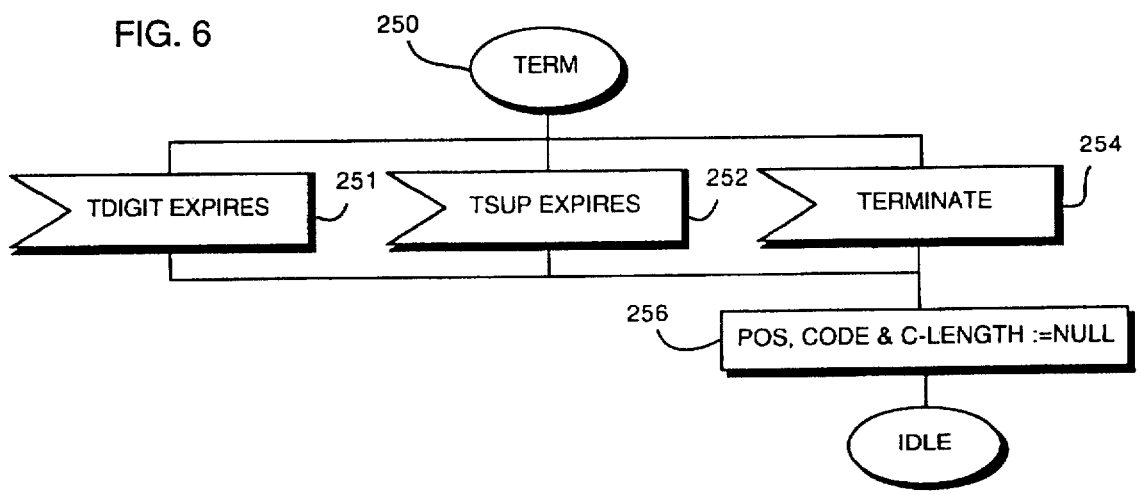
FIG. 6 is a flowchart diagram of termination procedures carried out at the user device when the service application transaction is terminated.

The encoded (or encrypted) and coded PIN, i.e., PIN", is then sent to the service application center 20 (block 246). A supervision timer Tsup is then initiated in block 248. As indicated in the termination algorithm 250 shown in FIG. 6, if the supervision timer (which measures the length of the current service transaction) expires (block 252) or the user switches off the UAS device (block 254), the position code and C-length value for the current transaction are set to null (block 256) and the current service transaction is terminated. The supervision timer assures that the overall transaction does not take longer than a typical transaction time which provides further security against fraud, tampering, hacking, etc.

Figure 7:
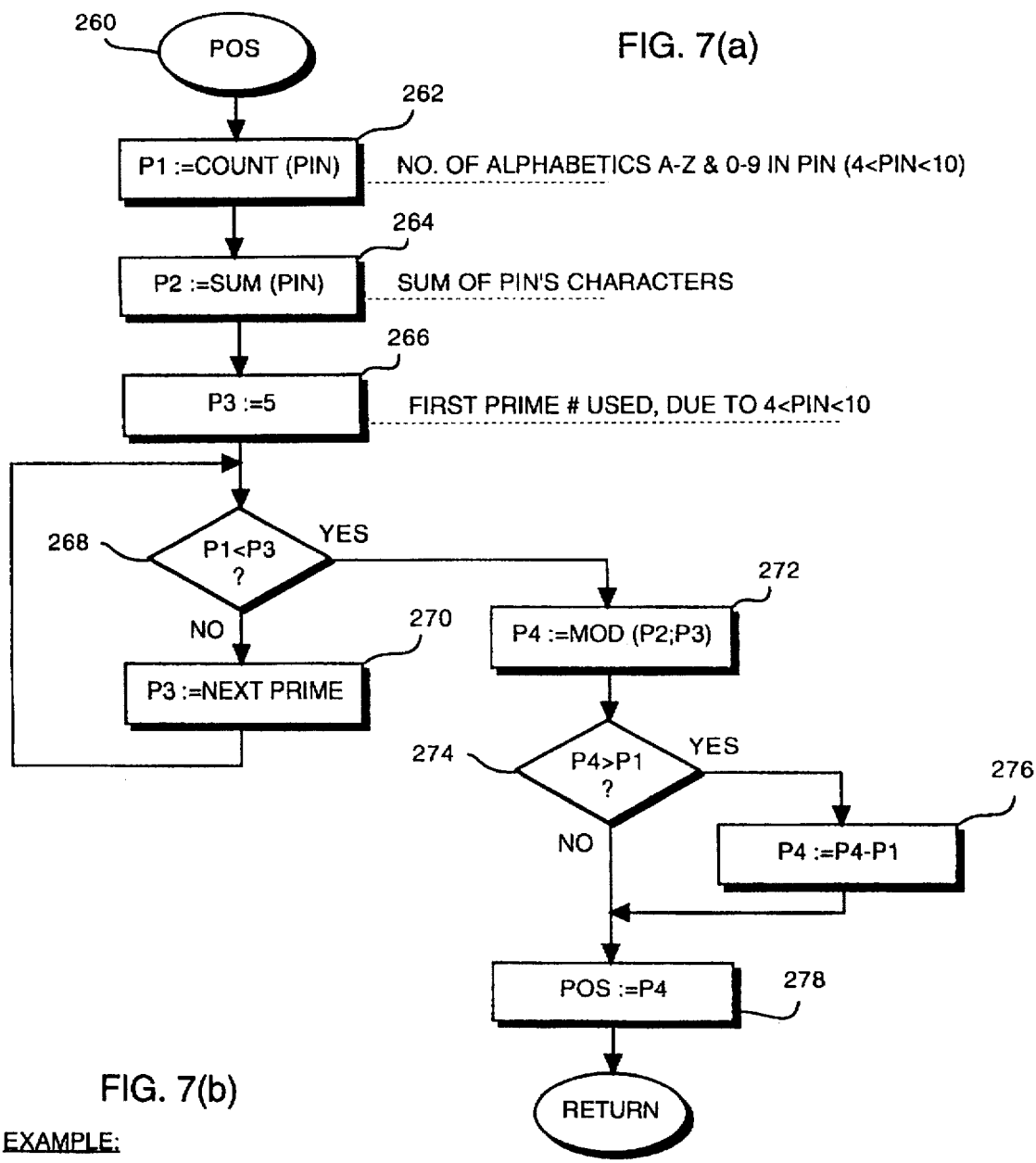
FIG. 7(a) is a flowchart diagram illustrating the procedures for determining a character position in the user entered PIN where a code is to be inserted.
FIG. 7(b) is a PIN code example showing a plurality of potential code insertion positions.

Reference is now made to the POS macro (starting at block 260) which outlines the specific procedures for determining the character insert position POS where the code is inserted in the encrypted PIN' in accordance with the present invention making reference to FIG. 7(A). In block 262, variable P1 is calculated to equal the number of digits or characters in the user entered PIN. Variable P2 is calculated as the sum of the PIN characters (block 264). Alphabetic characters or other non-numeric symbols are converted into decimal format (e.g., ASCII coded characters are converted to decimal) so that the summation can be performed. Variable P3 is set to a first prime exceeding the minimal PIN length allowed (e.g., for 4≦PIN length≦10, the first prime is 5), i.e., 5, (block 266). A decision is made in block 268 whether the variable P3 exceeds the variable P1; if not, P3 is set to the next prime number, i.e., 7, (block 270). This process continues until P1 is less than P3. Variable P4 is then calculated in block 272 in accordance with the following equation: P4=MOD(P2;P3). MOD stands for a modulo operation which provides the integer remainder after P2 is divided by P3. Value P4 is then compared with P1 in block 274. If P4 does not exceed P1, the position variable POS is set equal to P4 (block 278). Otherwise, P4=P4−P1 (block 276), to eliminate overflow and the position variable is equated to P4 (block 278).

FIG. 7(B) shows an example of character positions in an example PIN where the code may be inserted. Specifically, if the PIN code equals 25215 . . . , character positions Pos0, Pos1, Pos2, Pos3, Pos4, . . . precede each of these code digits, respectively.

Figure 8:
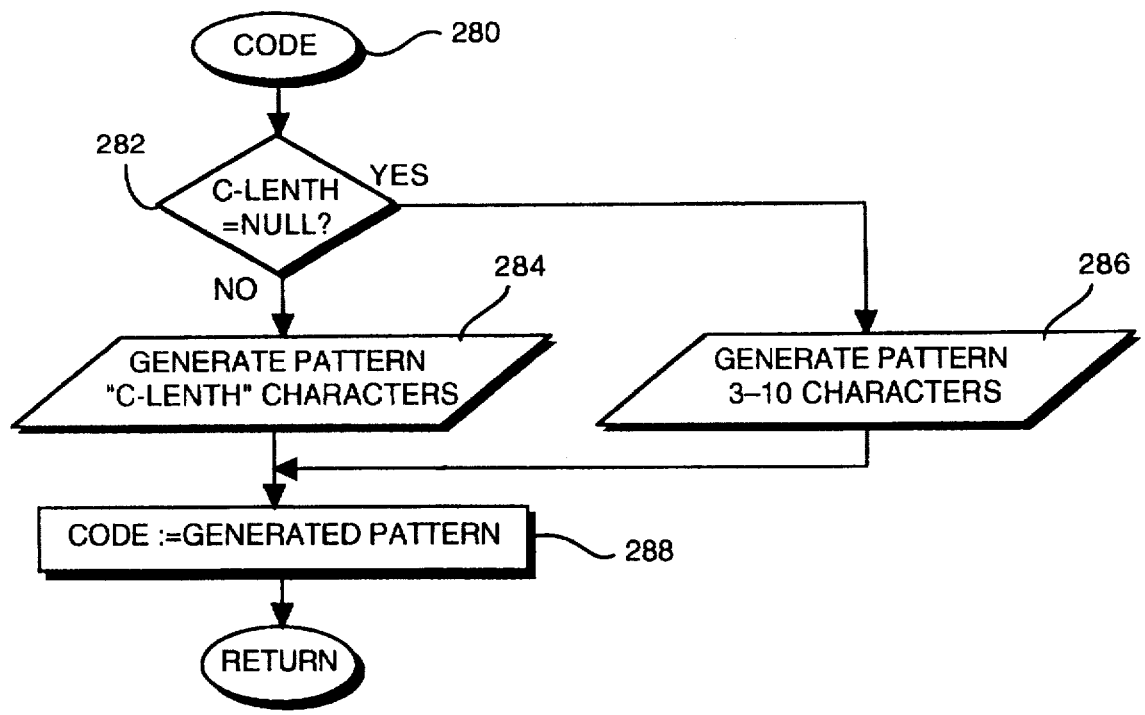
FIG. 8 is a flowchart diagram illustrating procedures for generating a code of variable length to be inserted at the position determined by the flowchart illustrated in FIG. 7(a)

Reference is now made to the Code macro 280 shown in FIG. 8. As in the main UAS device algorithm, a decision is made in block 282 whether or not the code length equals zero or null. If the code length has been set, a random or pseudo-random pattern of characters corresponding to the C-length (in this example it is limited the range of three to ten characters) is generated in block 284. If the code length has not been determined, the C-length=Count(Code), and a code corresponding to that length is randomly determined by the CPU 26 (block 286). In both instances, the code equals the generated pattern at the appropriate code length (block 288).

The Key macro 290 will now be described in conjunction with FIG. 9. A key variable K is determined in accordance with the following equation: K=MOD (Code; Z) as indicated in block 292. Essentially, K equals the code value determined in FIG. 8 divided by the security level Z subscribed by this particular user with the remainder of that division being set equal to the key in block 298. The variable K corresponds to an available key number (from 0 to Z-1 which corresponds to algorithm no. 1 through algorithm no. Z in this illustrative example). Moreover, the present invention provides as an additional security measure by prohibiting two successive encryptions of the same PIN using the same encryption algorithm. If in block 296 the variable K equals the previously used key (stored by the user device), the Code macro is reexecuted as indicated in block 294, providing a new code from which K is recalculated.

The present invention also permits the user to change his PIN in a highly secure fashion at the same security level in which the user's PIN is coded and encrypted. A significant benefit of this aspect of the present invention is that the user can securely and easily change his PIN without having to contact the UAS or the service application center or waiting for any written confirmation before the change is effective. Moreover, the PIN change procedure permits a user to securely and easily change his current PIN to a new PIN having a different number of digit positions than his current PIN. To help describe the PIN change procedure from the perspective of the user device, reference is made to the example given below:

EXAMPLE 2

UAS Change of PIN, user provided code, 3 algorithms

| 1) User enters PIN: | PIN=5573 |
|---|---|
| 2) Position MACRO: | Pos=MOD(20;5)=0 |
| 3) User enters C-length | C-length=2 |
| 4) Code MACRO: | Code=32 |
| 5) Key MACRO | Key=MOD (32;3)=2 |
| 6) Apply Codex with algorithm No.2: | PIN'=Codex(2) of PIN=6054 |
| 7) Insert Code into PIN' at position Pos: | PIN"=326054 |
| 8) User enters new PIN: | PIN=34789 |
| 9) Code MACRO: | Code=44 |
| 10) Key MACRO: | Key=MOD (44;3)=1 |
| 11) Apply Codex with algorithm No.1: | PIN'=Codex (1) of PIN=67321 |
| 7) Insert Code into PIN' at position Pos: | PIN"=4467321 |
| 8) User re-enters PIN: | PIN=34789 |
| 9) Code MACRO | Code=80 |
| 10) Generate key: | Key=MOD(80;3)=2 |
| 11) Apply Codex with algorithm No.2: | PIN'=Codex (2) of PIN=73456 |
| 7) Insert Code into PIN' at position Pos: | PIN"=8073456 |

In the PIN encoding process, the C-length and POS variables used for this transaction are saved in a UAS working memory space. This allows the user to change his PIN but at the same time retain the security level for the newly entered PIN. The original PIN in the example is 5573 (four characters), the code length is set to 2, the key is set to 2, and the position is set to 0, resulting in PIN" 326054 in accordance with the encoding procedures described above. Then the user enters in response to a prompt initiated by the UAS at the service application center 20 his new PIN 34789 (five characters). A new second code is generated along with a new second key, PIN' and PIN". In response to a prompt to reenter the new PIN, the user reenters the new PIN, resulting in the generation of a new and third set of code, key, PIN', and PIN".

With this information, the service application center 20 confirms the appropriate identity of the user through the original PIN and confirms the new PIN through the re-entry procedure without compromising security. Both times the new PIN is entered, it is fully encoded. Because the center 20 has the previous information, it confirms the identity between the two sequentially entered new PIN numbers, and thereafter, changes the PINs.

Figure 10A:
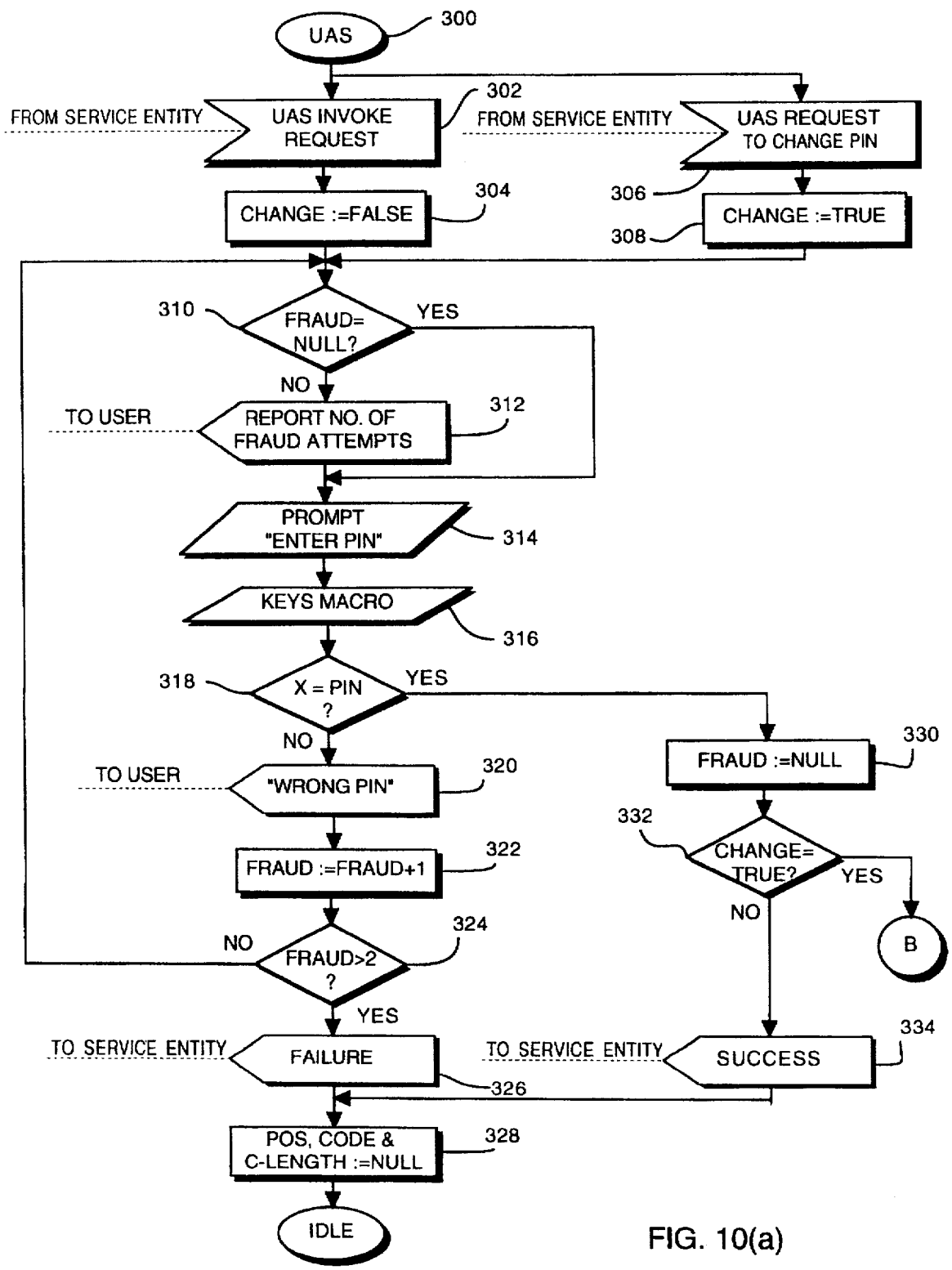
FIGS. 10(a) and 10(b) are flowcharts illustrating the user authentication service (UAS) which may be invoked by a service application entity at initiation of a service application request.
Figures 10B, 11:
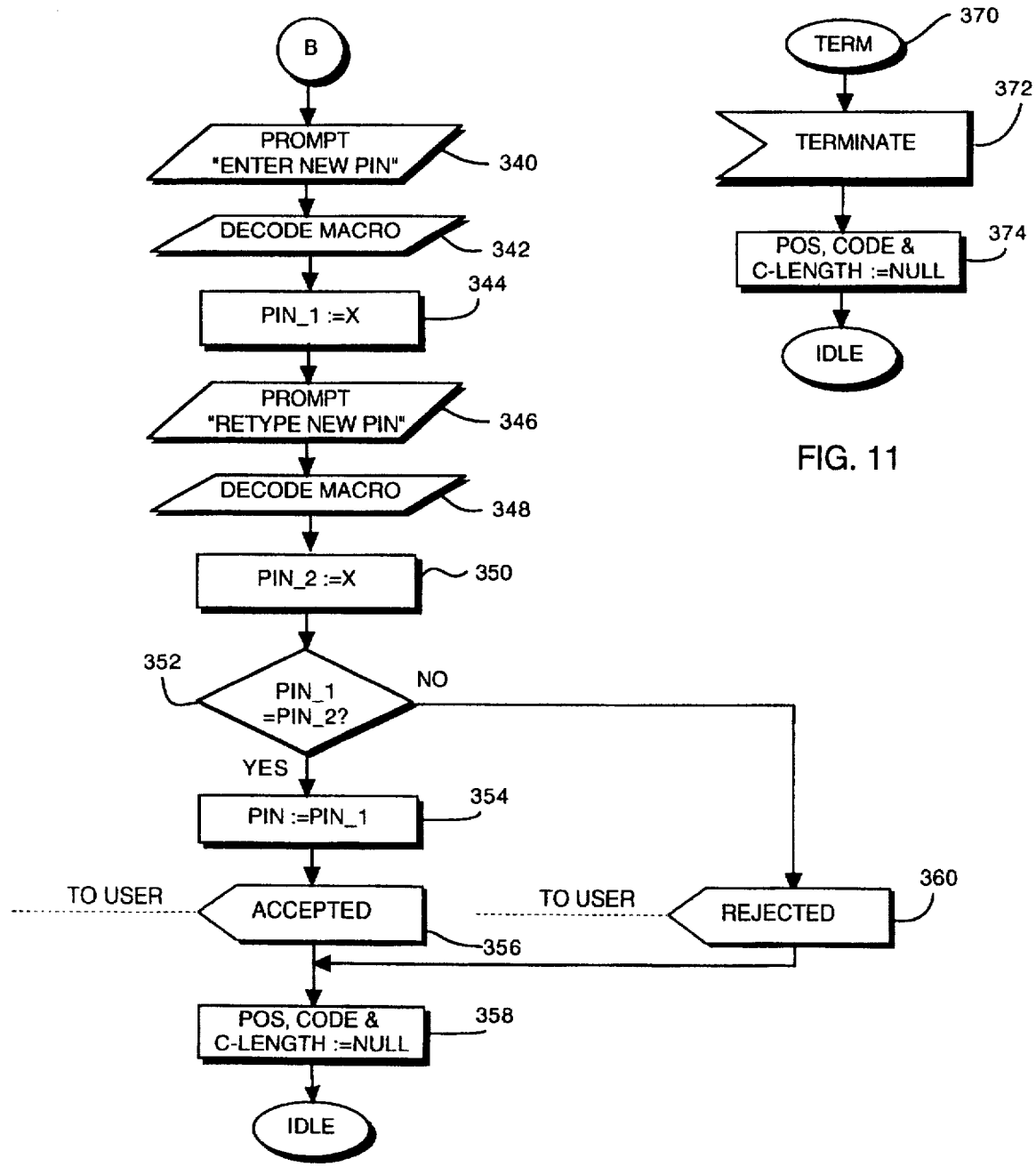
FIG. 11 is a flowchart diagram illustrating a termination procedure that may be used by the UAS in performing the procedures illustrated in FIGS. 10(a)–10(b)

The user authentication service (UAS) 300 as implemented at the service application center 20 using the hardware shown in FIG. 4 is now described in general in conjunction with FIGS. 10(A) and 10(B). When a user request for a particular service is received initially at the service application center, the appropriate service entity determines if this service request requires entry of a user PIN number and also if the user is further requesting to change his/her PIN. If the service request requires entry of a PIN and/or change of a PIN, the service entity invokes the UAS to determine the authenticity of the user making the request (blocks 302 and 306).

The UAS then determines whether to decode the received PIN information and confirm the authenticity of the user in which case control proceeds to block 302 or whether the user is also further requesting to change his PIN where control proceeds to block 306. A PIN change flag is set to false in block 304, and alternatively, the PIN change flag is set to true in block 308. In decision block 310, it is determined whether there have been any unsuccessful attempts to enter the user's PIN. Since unsuccessful attempts could be the work of a fraudulent user, the number of unsuccessful attempts is reported in block 312 directly to the user device display as a number of fraudulent attempts. This report has two beneficial uses. One is to inform the legitimate user that someone has attempted to use his PIN so that he can take the necessary precautionary action, such as changing his PIN or notifying the appropriate authorities. Second, the report may deter a fraudulent user from continuing to attempt access to the legitimate user's accounts and other services using this user's PIN number. In either situation, control proceeds to block 314 where a prompt message "enter PIN" is transmitted over the communications network to the user. The authenticate user then enters his PIN via the user device 22 which is transmitted back to the UAS over the communications path in its properly encoded form PIN". The received and encoded PIN is then processed in the Key macro (block 316) which is described in more detail below in connection with FIG. 14.

Before proceeding to describe the remainder of the flowcharts, the example provided illustrates how encoded PINs received at the UAS are decoded.

EXAMPLE 3
UAS invocation, at service center, 5 algorithms

| 1) Received PIN: | PIN"=346537577 |
|---|---|
| 2) Keys MACRO: | PIN-557346 ; C-length=10−6=4 |
| 3) Position MACRO: | Pos-MOD(3 1;7)=3 |
| 4) Decode MACRO: | Code=5437 ; PIN'=346577;<br>Key=MOD (5437 ;5)=2<br>X=Decoder (2) of PIN'=557356 |
| 5) Delete data (PIN=X): | C-length, Code & Pos=Null |

The next invocation of UAS will result in:

| 1) Received PIN: | PIN"=824735561 |
|---|---|
| 2) Keys MACRO: | PIN=557356; C-length=9−6=3 |
| 3) Position MACRO: | Pos=MOD (31;7)=3 |
| 4) Decode MACRO: | Code=735; PIN'=824561<br>Key=MOD(735;5)=0<br>X=Decoder (0) of PIN'=557356 |
| 5) Delete data (PIN-X): | C-length, Code, & Pos-Null |

The received PIN corresponds to the encrypted and encoded PIN". The Keys macro (FIG. 14) retrieves this user's PIN from the subscriber database and calculates a code length by subtracting the length of PIN" from the length of PIN. The Position macro is then executed to determine a character position and the Decode macro is provided to identify the code characters in the PIN" based on the code length and the position, to arrive at a PIN' which is then decoded using the appropriately calculated key to arrive at the user PIN—in this example 557356.

As example 3 shows, the next time that the user authentication service 300 is invoked for this user, a different encoded PIN" number is received (even though the PIN entered by the user is the same), and the same general process is carried out using the keys, position, and decode macros. Ultimately, the decoded PIN results in the same number, 557356.

Figure 14:
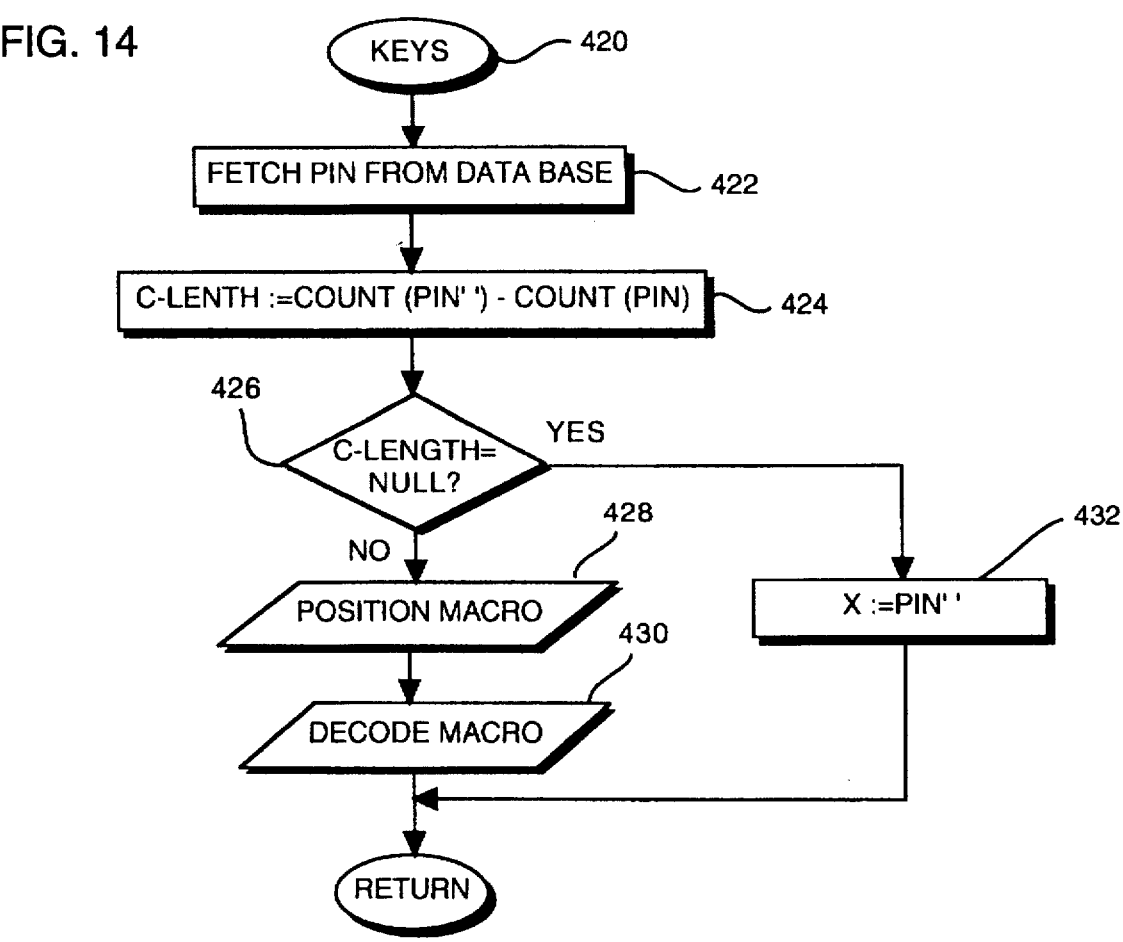
FIGS. 14 and 15 are flowcharts outlining UAS procedures for decoding a received encoded PIN in accordance with the present invention.

Returning to the Keys macro in FIG. 14, the user's corresponding PIN is retrieved from the UAS database (step 422) based on the identification of the user obtained at the initiation of a transaction, e.g., the user inserts his credit card with an identifying account number, etc. A code length is calculated in accordance with the equation C-length=count (PIN")−count(PIN) as indicated in block 424. Thus, the length of the PIN retrieved from the database is subtracted from the length of the encoded PIN" received over the communications network which leaves the number of characters that must therefore be the code length added by the user device.

A decision is made in block 426 whether the code length is equal to zero/null. If it is, that means that the user entered PIN number was not encoded, and therefore, the PIN number is exactly as received as indicated in block 432. Otherwise, control proceeds to the Position macro 380 (block 428) as will now will be described in connection with FIG. 12.

The routine illustrated in FIG. 12 is similar to that in FIG. 7(A). In block 382, variable P1 is calculated to equal the number of digits or characters in the retrieved PIN (i.e., stored in table 1). Variable P2 is calculated as the sum of the PIN characters (block 384). Alphabetic characters or other non-numeric symbols are converted into decimal format (e.g., for ASCII coded characters are converted to decimal) so that the summation can be performed. Variable P3 is set to a first prime number greater than 3, i.e., 5, (block 386). A decision is made in block 388 whether the variable P3 exceeds the variable P1; if not, P3 is set to the next prime number, i.e., 7, (block 390). This process continues until P1 is less than P3. Variable P4 is then calculated in block 392 in accordance with the following equation: P4=MOD (P2;P3). MOD stands for a modulo operation which provides the integer remainder when P2 is divided by P3. Value P4 is then compared with P1 in block 394. If P4 does not exceed P1, the position variable POS is set equal to P4 (block 398). Otherwise, P4=P4−P1 (block 396), and the position variable is equated to P4 (block 398).

Figure 15:
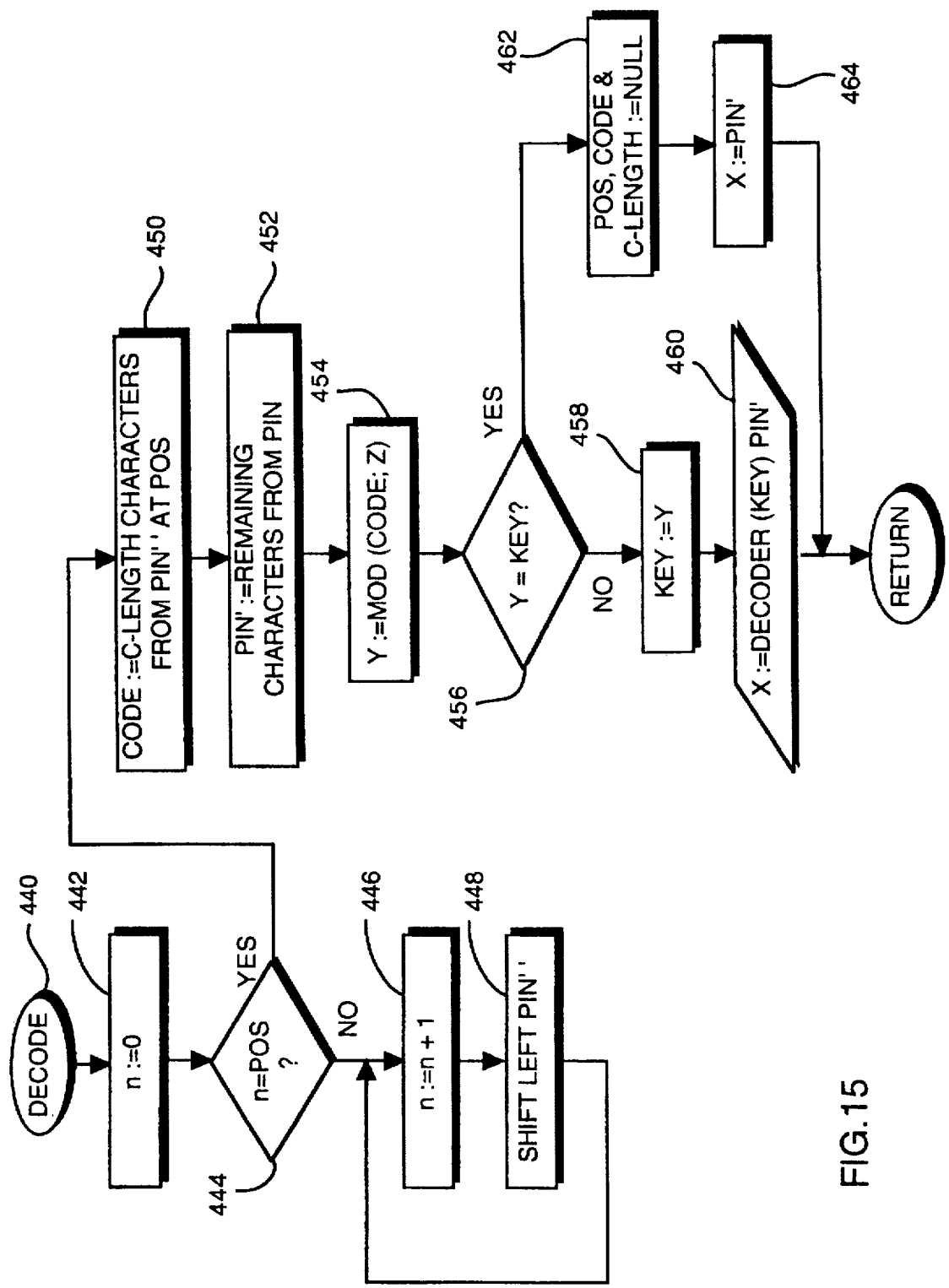

The Position macro executed in block 428 in FIG. 14 returns the position value POS which is then used by the Decode macro executed in block 430 to provide a decoded PIN value. Reference is made now to the Decode macro 440 illustrated in FIG. 15. In block 442, a position index N is set to 0, and the decision is made in block 444 whether the index equals the previously calculated position. If not, the index is incremented in block 446, and the received PIN" is shifted by one character position to the left (wrap-around style) in block 448. This shifting process occurs until the position index equals the position POS value. Thereafter, the code character values themselves can be determined from the previously determined code length, i.e., the number of characters in starting from the character position POS. Those code characters are then removed, resulting in PIN' as indicated in block 452. The encryption key is then calculated in accordance with the following formula: Y=MOD(Code; Z) as indicated in block 454. As already described above, the modulo operation divides the code by Z with the integer remainder being used as the key to select a decoding or decryption algorithm for the user subscribed security level.

Moreover, the present invention also checks that the received encoded PIN pattern generated by the same UAS user device differs from that previously received from that device, i.e., that the currently calculated encryption key (from block 454) differs from the previously obtained key (block 456). This procedure deters the possibility of an eavesdropper entering the same encoded PIN pattern as a result of listening on the communication lines. If the calculated Y and key values are the same (block 456), the POS, code and C-length are set to 0 (block 462), and the PIN' is not decoded (block 464), and as a result, will be registered as fraud attempt. When the encryption key and the calculated key (block 454) differ, the variable "key" (now equal to Y) is assigned as the calculated decoding PIN' (block 460).

The resulting decoded PIN value (X) is then returned to the Keys macro 420 which then returns the decoded PIN value X to decision block 318 in FIG. 10(A) where it is compared with the PIN retrieved from the user database 46. If the two PIN values are the same, the fraud flag is set to a null value in block 330. A decision is then made whether the change flag is set to true (block 332). If so, the user desires to change the PIN and control proceeds via flag B to the PIN changing procedures illustrated in FIG. 10(B). Otherwise, a successful entry of the PIN number is indicated to the service application center (block 334) which then may provide the requested service to the user. After the transaction is completed and ended, the position, code, and C-length values are set to 0 (block 328).

If the decoded PIN value X does not equal the retrieved PIN value, a "wrong PIN" message is provided to the user over the communications network as indicated in block 320. The fraud count is also incremented in block 322 which is used in subsequent retry attempts to report to the user the number of fraudulent attempts as indicated in block 312. A decision is made in block 324 whether the fraud count exceeds a predetermined limit, which in the example is two unsuccessful attempts. If not, the user is permitted another attempt to enter a correct PIN. Otherwise, failure is indicated to the application service center (block 326) which then takes appropriate action, e.g., terminate data transaction, and the position, code, and C-length values are set to 0 (block 328).

Referring now to FIG. 10(b), if a user desires to change his PIN at either blocks 308 or 332, the user is prompted through a request transmitted over the communications network to enter a new PIN (block 340). The new second entered PIN, encoded in accordance with the procedures already described above, is then decoded in accordance with procedures outlined in FIG. 15. Since the Keys macro was previously executed in block 316 described above and the transaction has not yet been terminated, the user PIN has already been retrieved from the service applications center database, the code length and position POS have been already calculated and stored. Accordingly, the Decode macro is executed as indicated in block 342 following procedures already described in FIG. 15 to return a second new PIN value, PIN__1, as indicated in block 344. The user is then prompted to "Retype the new PIN" as indicated in block 346 which is then received in its encoded format and decoded as indicated in block 348 to provide a third new PIN value, PIN__2, in block 350.

The PIN values PIN__1 and PIN__2 are compared in block 352. If there is a difference, a rejection message (block 360) is communicated to the user over the communications network, and the position, code, and C-length values are set to 0 (block 358), i.e., the transaction is terminated. If the two values match, the user PIN number is changed to PIN__1 as indicated in block 354 and stored in the subscriber database for this particular user. A message is forwarded to the user over the communications network (block 356) that the newly entered PIN has been accepted. Position, code, and C-length values are set to 0 (block 358) at transaction termination.

Upon a failure, such as exceeding the number of fraudulent attempts in block 324 or a rejected attempt to change the PIN as indicated in block 360, and upon deactivation (the user turns off the user device or the transaction is ended), a termination routine 370 is executed as shown in FIG. 11. A terminate procedure is executed in block 370, and the position, code, and C-length variables are set to 0 (block 374).

The PIN changing procedure from the UAS perspective is illustrated in the following example.

EXAMPLE 4

UAS Change of PIN at service center, 3 algorithms

| | |
|---|---|
| 1) Received PIN: | PIN"=326054 |
| 2) Keys MACRO: | PIN=5573; C-length=6−4=2 |
| 3) Position MACRO: | Pos=MOD(20;5)=0 |
| 5) Decode MACRO: | Code=32; PIN'=6054; |
| | Key=MOD (32;3)=2 |
| | X=Decoder (2) of PIN'=5573 |
| 6) New PIN received: | PIN"=4467321 |
| 7) Decode MACRO: | Code=44; PIN'=67321; |
| | Key=MOD(44;3)=1 |
| | PIN__1=Decoder(1) of PIN'=34789 |
| 8) Retyped PIN received: | PIN"=8073456 |
| 9) Decode MACRO: | Code=80; PIN'=73456; |
| | Key=MOD(80;3)=2 |
| | PIN__2=Decoder(2) of PIN'=34789 |
| 10) Register new PIN(PIN__1=PIN__2): | PIN=34789 |
| 11) Delete data: | C-length, Code, & Pos=Null |

From the examples and description provided above, it is evident that the present invention provides both a highly secure and user friendly security access method and system. A user need only memorize one PIN code, and if desired, select a code length for each transaction. The user's authentication service device generates a unique PIN at each transaction that is both coded and encoded/encrypted differently for each transaction. Such a non-contiguous and encoded/encrypted PIN sequence having an additional, randomly-generated code embedded therein provides a high degree of confidence that the PIN communication will be secure against both hackers at other service terminals as well as visual and electronic eavesdroppers. The user authentication service initiated by the service application center safely decodes and confirms the authenticity of the user with a high degree of confidence. The use of various levels with each security level having a plurality of particular encoding/encryption algorithms and each increasing level having increasing levels of encoding/encryption complexity provides the user with a flexible and wide variety of security options. Moreover, this same high security level may be maintained even when the user conveniently, unilaterally, and immediately changes his PIN code using only his user device. Nothing more than a single PIN code needs to be memorized for any service transactions requiring a PIN entry or PIN changes. The present invention also provides for a quick detection of fraudulent attempts for immediate notification to the user's service application entity and unauthorized user.

While the invention has been described in connection with that is presently is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a system for providing user services electronically using a communications network, a method comprising the steps of:

(a) entering a user's personal identification string of two or more characters;

(b) determining a character position of the user's personal identification string;

(c) generating a code;

(d) combining the code with the user's personal identification string at the determined character position to generate a user identification code; and (e) transmitting the user identification code along with a user's service request over the communications network.

2. The method in claim 1, further comprising:

encoding the user's personal identification string using one of the encoding algorithms to provide an encoded identification string, wherein step (d) combines the code with the encoded identification string.

3. The method in claim 2, further comprising:

selecting a key corresponding to one of plural encoding algorithms, wherein the user's personal identification string is encoded using the encoding algorithm corresponding to the selected variable key.

4. The method in claim 2, wherein the encoding step includes encrypting the user's personal identification string using one of a plurality of encrypting algorithms corresponding to a selected variable key to provide an encrypted identification string.

5. The method in claim 1, wherein the character position is determined in step (b) using the entered user's personal identification string.

6. The method in claim 5, wherein the using step includes:

counting a number of characters in the entered user's personal identification string to provide a count;

summing the characters or values corresponding to the characters in the entered user's personal identification string to provide a sum;

selecting a prime number based on the entered user's personal identification string;

dividing the sum by the selected prime number resulting in a quotient and a remainder; and assigning the remainder as the character position if the remainder is less than the count, otherwise assigning a difference between the remainder and the count as the position character.

7. The method in claim 6, wherein the selecting step includes:

comparing the count to a determined prime number;

if the count exceeds the determined prime number, determining a succeeding prime number and repeating the comparing step;

if the count is less than the determined prime number, using the determined prime number as the selected prime number.

8. The method in claim 1, wherein the characters may include numbers or alphabetic characters and wherein the alphabetic characters are converted from an ASCII code to a corresponding decimal value before summing.

9. The method in claim 1, wherein the user selects a length of the code and step (c) includes generating a pattern of characters randomly or pseudo-randomly.

10. The method in claim 1, wherein step (c) includes generating a pattern of characters randomly or pseudo-randomly and the pattern includes a variable number of characters that may vary each time step (a) is performed.

11. The method in claim 3, further comprising:

converting the code to a code number;

dividing the code number by a prime number corresponding to a security level; and selecting as the key a remainder of the dividing step.

12. The method in claim 3, wherein a user subscribes to a security level to be associated with a current request for service such that the subscribed security level is used in selecting the key.

13. The method in claim 12, wherein the security level corresponds to a number of encoding algorithms, a greater number of encoding algorithms corresponding to a higher security level.

14. The method in claim 13, wherein the security level further includes a level of sophistication of the encoding algorithms.

15. The method in claim 3, further comprising:

restricting the selected key such that the selected key is not the same as a preceding selected key.

16. The method in claim 1, further comprising:

permitting the user to enter a length of the code for a current service transaction to be generated in step (b).

17. The method in claim 2, wherein the combining step (d) includes:

shifting the encoded user identification string by a number corresponding to the determined character position, and inserting the determined code in the encoded user identification string after shifting is completed.

18. The method in claim 1, further comprising the step of establishing a transaction timer during which a user must complete a transaction including steps (a)–(e), the transaction being automatically terminated at expiration of the transaction timer.

19. The method in claim 1, further comprising:

after step (e), performing a request to change the user's personal identification string to a new user's personal identification string including:

entering the new user's personal identification string and performing steps (c)–(e) to generate a new user identification code;

reentering the new user's personal identification string and performing steps (c)–(e) to generate a reentered user identification code, wherein if the new and reentered user identification codes match, the user's personal identification string is changed to the new user personal identification string.

20. A user service requesting device for permitting a user to request user services electronically over a communications network, comprising:

a keypad for entering a request for a particular user service and a user's personal identification string;

a memory for storing a user authentication program and plural encoding algorithms;

data processing circuitry for performing the steps of:

(a) determining a character position of the user's personal identification string;

(b) generating a code;

(c) encoding the user's personal identification string using one of the encoding algorithms to provide an encoded identification string; and (d) combining the code with the encoded identification string at the determined character position to generate a user identification code; and communications circuitry for providing the user identification code along with the user's service request to the communications network.

21. The device in claim 20, wherein the data processing circuitry further selects a variable key corresponding to one of plural encoding algorithms, wherein the user's personal identification string is encoded using the encoding algorithm corresponding to the selected variable key.

22. The device in claim 20, wherein the character position is determined using the entered user's personal identification string.

23. The device in claim 20, wherein the data processing circuitry further performs the steps of:
counting a number of characters in the entered user's personal identification string to provide a count;
summing the characters or values corresponding to the characters in the entered user's personal identification string to provide a sum;
selecting a prime number based on the entered user's personal identification string;
dividing the sum by the selected prime number resulting in a quotient and a remainder; and
assigning the remainder as the character position if the remainder is less than the count, otherwise assigning a difference between the remainder and the count as the position character.

24. The device in claim 20, further comprising a number generator for generating a pattern of characters randomly or pseudo-randomly.

25. The device in claim 20, wherein the data processing circuitry further performs the steps of:
converting the code to a number;
dividing the code by a prime number corresponding to a security level; and
selecting as the key a division remainder.

26. The device in claim 21, further comprising:
restricting the selected key such that the selected key is not the same as a preceding selected key.

27. The device in claim 20, wherein the data processing circuitry further performs the steps of:
shifting the encoded user identification string by a number corresponding to the determined character position, and
inserting the determined code in the encoded user identification string after shifting is completed.

28. The device in claim 20, wherein when the user desires to change the user's personal identification string, the user enters a new user's personal identification string and the data processing circuitry performs steps (b)–(d) to generate a new user identification code; and
the user reenters the new user's personal identification string and the data processing circuitry performs steps (b)–(d) to generate a reentered user identification code, wherein if the new and reentered user identification codes match, the user's personal identification string is changed to the new user personal identification string.

29. A user authentication service for authenticating an identity of a user requesting a service over a communications network, comprising the steps of:
(a) storing for each of a plurality of subscribers a subscriber identification number along with a corresponding personal identification character string;
(b) receiving a request to authenticate an identity of a user requesting a service over a communications network and determining a subscriber identification number corresponding to the user;
(c) prompting the user over the communications network to enter a personal identification character string and receiving an encoded character string;
(d) determining a code length based on a difference between the retrieved string and the encoded string to provide a number of code characters;
(e) determining a character position;
(f) removing the number of code characters beginning at the determined character position leaving a reduced character string;
(g) decoding the reduced character string using one of plural decoding algorithms to provide a user entered personal identification character string; and
(h) comparing the user entered character string with the stored character string corresponding to the determined subscriber identification number.

30. The user authentication service according to claim 29, further comprising:
determining a number of occurrences where the user entered character string is not the same as the stored character string, and
reporting the number of occurrences each time the user authentication service is requested.

31. The user authentication service according to claim 30, wherein the number of occurrences is reported to the user before the prompting step as a number of potentially fraudulent and unsuccessful attempts to enter an authenticate personal identification character string.

32. The user authentication service according to claim 29, further comprising:
determining a number of occurrences where the user entered character string is not the same as the retrieved character string;
terminating the service request transaction when the number of occurrences exceeds a predetermined value.

33. The user authentication service according to claim 32, wherein the terminating step includes resetting the code length and the character position to zero.

34. The user authentication service according to claim 29, further comprising:
(1) when the character strings compared in step (h) are the same, detecting a user request to change the user's current personal identification character string;
(2) prompting the user to enter a second personal identification character string and receiving a second encoded character string;
(3) removing the code length of characters beginning at the determined character position leaving a second reduced character string;
(4) decoding the second reduced character string using a second one of plural decoding algorithms to provide a second user entered personal identification character string;
(5) prompting the user to reenter the second personal identification character string and receiving a third encoded character string,
(6) removing the code length of characters beginning at the determined character position leaving a third reduced character string;
(7) decoding the third reduced character string using a third one of plural decoding algorithms to provide a third user entered personal identification character string;
(8) registering the second personal identification character string as the user's new personal identification character string if the second and third user entered personal identification character strings decoded in steps (4) and (7) are the same.

35. The user authentication service in claim 34, further comprising:
starting a timer after step (1).

terminating a current user transaction to change the user's personal identification character string if the timer reaches a predetermined value.

36. The user authentication service in claim 29, further comprising:

maintaining a database for plural subscribers including for each subscriber a subscriber identifier, a personal identification character string, and a security level, wherein the subscriber upon being authenticated may change the personal identification character string.

37. The user authentication service in claim 36, wherein the user authentication service includes a plurality of security levels, each security level corresponding to a level of sophistication of the encoding/decoding algorithms used to decode the user entered personal identification character string with higher levels corresponding to increasing sophistication, the subscriber being permitted to selectively subscribe to any of the security levels.

38. The user authentication service in claim 37, wherein each security level further includes a plurality of encoding/decoding algorithms divided into tiers, each tier includes a number of encoding/decoding algorithms with higher tiers having a larger number of encoding/decoding algorithms, the user being permitted to selectively subscribe to any of the tiers.

39. The user authentication service in claim 38, wherein upon initiation of a user request, the user authentication service retrieves the corresponding user's current security level and personal identification character string.

40. The user authentication service in claim 29, further comprising:

selecting a key corresponding to one of plural encoding/decoding algorithms, wherein the user's personal identification string is decoded using one of the encoding/decoding algorithm corresponding to the selected variable key.

41. The user authentication service in claim 29, wherein the character position is determined using the user's personal identification string.

42. The user authentication service in claim 41, wherein the using step includes:

counting a number of characters in the user's personal identification string to provide a count;

summing the characters or values corresponding to the characters in the user's personal identification string to provide a sum;

selecting a prime number based on the user's personal identification string;

dividing the sum by the selected prime number resulting in a quotient and a remainder; and assigning the remainder as the character position if the remainder is less than the count, otherwise assigning a difference between the remainder and the count as the position character.

43. The user authentication service in claim 42, wherein the selecting step includes:

comparing the count to a determined prime number;

if the count exceeds the determined prime number, determining a succeeding prime number and repeating the comparing step;

if the count is less than the determined prime number, using the determined prime number as the selected prime number.

44. The user authentication service in claim 29, wherein the number of code characters may vary each time step (c) is performed.

45. The user authentication service in claim 29, wherein the decoding step (g) further includes:

converting the removed code characters into a code number;

dividing the code number by a prime number corresponding to a security level; and selecting the one decoding algorithm using a remainder of the dividing step.

46. A user authentication service providing a user with a plurality of different security levels in conducting electronic service requests including for each security level one or more memories storing a plurality of encryption algorithms wherein the user selects a security level and a number of encryption algorithms from the plurality of encryption algorithms corresponding to the selected level.

47. The user authentication service according to claim 46, wherein the greater the number of encryption algorithms selected, the greater the security.

48. The user authentication service according to claim 46, wherein different ones of the plurality of security levels include encryption algorithms of different sophistication such that selection of a security level having a greater degree of sophistication provides greater security.

49. A method of encrypting a personal identification string, comprising:

(a) entering a personal identification string, and (b) inserting a random code in between characters in the personal identification string at a predetermined position that varies each time the personal identification string is entered.

50. The method in claim 49, further comprising:

encrypting the personal identification string and inserting the random code between characters in the personal identification string in accordance with one of a plurality of encryption techniques.

51. A method of encrypting a personal identification string, comprising:

(a) entering a personal identification string, and (b) inserting a random code in between characters in the personal identification string, wherein a length of the code may vary each time the personal identification string is entered.

52. The method in claim 49, wherein the position if generated using the entered identification string.

53. The method in claim 49, wherein the user selects for each entry of the personal identification string a length of the code.

54. The method in claim 49, wherein the code and character position where the code is inserted vary each time the personal identification string is entered.

* * * * *